to the two
housings and the two rotation parts. In this way, in a folding
or unfolding process of the foldable mobile terminal, relative sliding of the flexible display relative to the two
housings and the rotation parts can be avoided, thereby
reducing a risk of damaging the flexible display. In addition,
a part of the flexible display that is opposite to the main shaft
can be bent freely.

US012464059B2

(12) United States Patent
Liao et al.

(10) Patent No.: US 12,464,059 B2
(45) Date of Patent: Nov. 4, 2025

(54) FOLDABLE MOBILE TERMINAL

(71) Applicant: HUAWEI TECHNOLOGIES CO., LTD., Guangdong (CN)

(72) Inventors: Li Liao, Dongguan (CN); Bo Huang, Shanghai (CN); Tao Huang, Dongguan (CN); Ding Zhong, Dongguan (CN); Zhixiao Xu, Shanghai (CN); Shangyun Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 509 days.

(21) Appl. No.: 17/866,770

(22) Filed: Jul. 18, 2022

(65) Prior Publication Data

US 2022/0353355 A1    Nov. 3, 2022

Related U.S. Application Data

(63) Continuation of application No. PCT/CN2020/139959, filed on Dec. 28, 2020.

(30) Foreign Application Priority Data

Jan. 19, 2020   (CN) .......................... 202010059260.1

(51) Int. Cl.
*H04M 1/02* (2006.01)
*G06F 1/16* (2006.01)

(52) U.S. Cl.
CPC ........ *H04M 1/0216* (2013.01); *G06F 1/1616* (2013.01); *G06F 1/1652* (2013.01); *H04M 1/0268* (2013.01); *H04M 2201/38* (2013.01)

(58) Field of Classification Search
CPC ............. H04M 1/0216; H04M 1/0268; H04M 2201/38; G06F 1/1652; G06F 1/1616
See application file for complete search history.

(56) References Cited

U.S. PATENT DOCUMENTS 9,021,657 B2    5/2015   Park et al.
9,348,450 B1    5/2016   Kim
(Continued)

FOREIGN PATENT DOCUMENTS

CN    101107451 A    1/2008
CN    101840247 A    9/2010
(Continued)

OTHER PUBLICATIONS

Korean Intellectual Property Office Notice to Submit a Response for Application No. 10-2022-7025243 dated Jul. 3, 2023, 17 pages.
(Continued)

*Primary Examiner* — Jinsong Hu
*Assistant Examiner* — Farideh Madani

(57) ABSTRACT

The technology of this application relates to a foldable mobile terminal. The foldable mobile terminal includes a rotating shaft mechanism, two housings, and a flexible display. The flexible display is embedded into the two housings and covers the rotating shaft mechanism. The rotating shaft mechanism has a main shaft and two rotation parts, and the rotation part rotates with the housing on a corresponding side. The flexible display is fixed to the two housings and the two rotation parts. In this way, in a folding or unfolding process of the foldable mobile terminal, relative sliding of the flexible display relative to the two housings and the rotation parts can be avoided, thereby reducing a risk of damaging the flexible display. In addition, a part of the flexible display that is opposite to the main shaft can be bent freely.

12 Claims, 5 Drawing Sheets

(56) References Cited

U.S. PATENT DOCUMENTS

| | | | |
|---|---|---|---|
| 9,677,308 | B1 | 6/2017 | Chen et al. |
| 10,036,188 | B1 | 7/2018 | Yao et al. |
| 10,231,347 | B2 | 3/2019 | Seo et al. |
| 10,469,635 | B1 | 11/2019 | Carlson et al. |
| 10,838,458 | B1 | 11/2020 | Park et al. |
| 10,845,850 | B1 | 11/2020 | Kang et al. |
| 11,231,754 | B2 | 1/2022 | Kang et al. |
| 11,467,633 | B2 | 10/2022 | Liao et al. |
| 2007/0129609 | A1 | 6/2007 | Kawasaki |
| 2014/0217875 | A1 | 8/2014 | Park et al. |
| 2015/0233162 | A1 | 8/2015 | Lee et al. |
| 2016/0116944 | A1 | 4/2016 | Lee et al. |
| 2016/0302314 | A1 | 10/2016 | Bae et al. |
| 2017/0142240 | A1 | 5/2017 | Xu |
| 2017/0365197 | A1 | 12/2017 | Kim et al. |
| 2018/0024589 | A1 | 1/2018 | Nakamura et al. |
| 2018/0049329 | A1 | 2/2018 | Seo et al. |
| 2018/0324964 | A1 | 11/2018 | Yoo et al. |
| 2019/0163241 | A1 | 5/2019 | Moon et al. |
| 2019/0166703 | A1 | 5/2019 | Kim et al. |
| 2019/0196543 | A1 | 6/2019 | Mizoguchi et al. |
| 2019/0207141 | A1 | 7/2019 | Kim et al. |
| 2019/0268456 | A1 | 8/2019 | Park et al. |
| 2019/0286195 | A1 | 9/2019 | Lin |
| 2019/0339742 | A1 | 11/2019 | Jia |
| 2019/0390703 | A1 | 12/2019 | Hsu |
| 2020/0097051 | A1 | 3/2020 | Liu |
| 2020/0348732 | A1* | 11/2020 | Kang .................... G06F 1/1652 |
| 2021/0041921 | A1 | 2/2021 | Kang et al. |
| 2021/0181808 | A1 | 6/2021 | Liao et al. |
| 2021/0267077 | A1 | 8/2021 | Zhang et al. |
| 2021/0373612 | A1 | 12/2021 | Hwang et al. |
| 2022/0011828 | A1 | 1/2022 | Zhan et al. |
| 2022/0104370 | A1 | 3/2022 | Wu et al. |
| 2022/0113770 | A1 | 4/2022 | Kang et al. |
| 2022/0137676 | A1 | 5/2022 | Tian et al. |
| 2022/0217859 | A1 | 7/2022 | Lee et al. |
| 2022/0303371 | A1 | 9/2022 | Liao et al. |
| 2022/0377919 | A1 | 11/2022 | Zhang et al. |

FOREIGN PATENT DOCUMENTS

| | | | |
|---|---|---|---|
| CN | 104836865 | A | 8/2015 |
| CN | 105096752 | A | 11/2015 |
| CN | 105491193 | A | 4/2016 |
| CN | 205750631 | U | 11/2016 |
| CN | 205881905 | U | 1/2017 |
| CN | 106601130 | A | 4/2017 |
| CN | 107632661 | A | 1/2018 |
| CN | 207010739 | U | 2/2018 |
| CN | 207115888 | U | 3/2018 |
| CN | 108173995 | A | 6/2018 |
| CN | 108665812 | A | 10/2018 |
| CN | 108712535 | A | 10/2018 |
| CN | 109032251 | A | 12/2018 |
| CN | 109118964 | A | 1/2019 |
| CN | 109257460 | A | 1/2019 |
| CN | 208421695 | U | 1/2019 |
| CN | 208596323 | U | 3/2019 |
| CN | 208622359 | U | 3/2019 |
| CN | 109658826 | A | 4/2019 |
| CN | 109686267 | A | 4/2019 |
| CN | 208689844 | U | 4/2019 |
| CN | 109830185 | A | 5/2019 |
| CN | 208922657 | U * | 5/2019 |
| CN | 109859630 | A | 6/2019 |
| CN | 110007715 | A | 7/2019 |
| CN | 110010001 | A | 7/2019 |
| CN | 110010008 | A | 7/2019 |
| CN | 110022386 | A | 7/2019 |
| CN | 110058444 | A | 7/2019 |
| CN | 110061039 | A | 7/2019 |
| CN | 209164358 | U | 7/2019 |
| CN | 110166591 | A | 8/2019 |
| CN | 110189638 | A | 8/2019 |
| CN | 110265438 | A | 9/2019 |
| CN | 209358590 | U | 9/2019 |
| CN | 209375705 | U | 9/2019 |
| CN | 209414382 | U | 9/2019 |
| CN | 209545628 | U | 10/2019 |
| CN | 110445913 | A | 11/2019 |
| CN | 209593488 | U | 11/2019 |
| CN | 110557481 | A | 12/2019 |
| CN | 209860956 | U | 12/2019 |
| CN | 110853510 | A | 2/2020 |
| CN | 111477115 | A | 7/2020 |
| CN | 212061687 | U | 12/2020 |
| CN | 113053238 | A | 6/2021 |
| EP | 3734947 | A1 | 11/2020 |
| JP | 2018112836 | A | 7/2018 |
| JP | 6453413 | B1 | 1/2019 |
| KR | 20160089164 | A | 7/2016 |
| KR | 20160144299 | A | 12/2016 |
| KR | 20190049242 | A | 5/2019 |
| KR | 20190062107 | A | 6/2019 |
| KR | 102007426 | B1 | 8/2019 |
| RU | 2596469 | C2 | 9/2016 |
| RU | 2683290 | C2 | 3/2019 |
| WO | 2015126068 | A1 | 8/2015 |
| WO | 2017160680 | A1 | 9/2017 |
| WO | 2018070778 | A1 | 4/2018 |
| WO | 2019149238 | A1 | 8/2019 |
| WO | 2019151839 | A1 | 8/2019 |
| WO | 2019223009 | A1 | 11/2019 |
| WO | 2019227296 | A1 | 12/2019 |

OTHER PUBLICATIONS

Office Action for Chinese Application No. 202080085591 dated Feb. 1, 2023, 7 pages.
Office Action for Japanese Application No. 2022-539094 dated Oct. 24, 2023, 8 pages (with translation).
Office Action for Chinese Application No. 202211049467.6 dated Jul. 17, 2023, 9 pages.
European Search Report for EP Application No. 24157331 dated Jul. 31, 2024, 7 pages.
Office Action for Chinese Application No. 202010059260 dated Sep. 3, 2021, 7 pages.
Evaluation Report of Utility Model Patent for Chinese Application No. 202020343479 dated Jan. 19, 2022, 250 pages.
Office Action for Chinese Application No. 202110921357 dated Mar. 17, 2022, 7 pages.
Office Action for Indian Application No. 202217036823 dated Nov. 18, 2022, 7 pages.
Office Action for U.S. Appl. No. 17/363,078 dated Jul. 20, 2022, 46 pages.
Office Action for Indian Application No. 202237037955 dated Oct. 16, 2023, 5 pages.
Notice of Allowance for U.S. Appl. No. 17/514,596 dated Apr. 4, 2023, 63 pages.
Office Action for Chinese Application No. 202211376412 dated Mar. 31, 2023, 9 pages.
Notice of Allowance for U.S. Appl. No. 17/363,078 dated Jan. 12, 2023, 40 pages.
Office Action for Chinese Application No. 202211380744.1 dated May 15, 2023, 7 pages.
Notice of Allowance for U.S. Appl. No. 17/487,292 dated Feb. 8, 2023, 140 pages.
Decision to Grant for Russian Application No. 2022120356 dated Feb. 1, 2023, 32 pages.
Office Action for Korean Application No. 10-2004-7013824 dated Nov. 6, 2024, 13 pages.

* cited by examiner

FOLDABLE MOBILE TERMINAL

CROSS-REFERENCE TO RELATED APPLICATIONS

This application is a continuation of International Application No. PCT/CN2020/139959, filed on Dec. 28, 2020, which claims priority to Chinese Patent Application No. 202010059260.1, filed on Jan. 19, 2020. The disclosures of the aforementioned applications are hereby incorporated by reference in their entireties.

TECHNICAL FIELD

This application relates to the field of terminal technologies, and in particular, to a foldable mobile terminal.

BACKGROUND

With gradual maturity of a flexible display technology, a display manner of a terminal device is driven to greatly change. A foldable flexible display mobile phone, a foldable flexible display tablet computer, a wearable electronic device with a foldable flexible display, or the like is an important evolution direction of an intelligent terminal device in the future.

A flexible display is the key to a technology of a foldable flexible display intelligent terminal device, and the flexible display is a relatively fragile part. In a folding process, if the flexible display slides relative to a housing, it is likely to cause uneven pressure or tension at various locations of the flexible display, resulting in deformation of and damage to the flexible display.

Therefore, in a folding process of the foldable flexible display intelligent terminal device, how to prevent the flexible display from sliding relative to the housing to avoid damage to the flexible display because of uneven forces at various locations becomes an urgent problem to be solved in a development process of the foldable mobile terminal field.

SUMMARY

Embodiments of this application provide a foldable mobile terminal, so as to prevent a flexible display from being affected by tension or pressure, thereby prolonging a service life of the flexible display.

This application provides a foldable mobile terminal. The mobile terminal includes a rotating shaft mechanism, two housings, and a flexible display, where the flexible display is embedded into the two housings and covers a rotating shaft mechanism. The rotating shaft mechanism has a main shaft and two rotation parts, the two rotation parts are respectively disposed on two sides of the main shaft, and the two rotation parts can rotate around the main shaft to form an accommodating space for accommodating the flexible display. The two housings of the foldable mobile terminal are respectively disposed on two sides of the rotating shaft mechanism, each housing has an accommodating slot on a side close to the rotating shaft mechanism, and the rotation part may be disposed in an accommodating slot of the housing on a same side. When the housing rotates around the main shaft, the rotating shaft mechanism on a same side rotates accordingly. The flexible display is fixedly connected to the two housings and the two rotation parts, and a part of the flexible display that is opposite to the main shaft has no connection relationship with the main shaft. In this way, in a process in which the housings and the rotation parts rotate around the main shaft, the part of the flexible display that is opposite to the main shaft can be bent freely. In the foldable mobile terminal of this application, the flexible display is fixedly connected to the two housings and the two rotation parts, so that in a folding process or an unfolding process of the foldable mobile terminal, relative sliding of the flexible display relative to the two housings and the rotation parts can be avoided, thereby reducing a risk of damaging the flexible display. In addition, the part of the flexible display that is opposite to the main shaft can be bent freely. In this way, a part of the flexible display that is disposed in the rotating shaft mechanism can be accommodated in the accommodating space formed by the two rotation parts and the main shaft, so as to prevent the flexible display from being affected by tension or pressure, which helps to prolong a service life of the flexible display.

In a possible implementation of this application, the housing may include a front housing and a rear housing that are disposed in an overlapping manner. The flexible display is fixedly connected to the front housing, and an accommodating slot is formed between an end portion of the front housing that is close to the rotating shaft mechanism and the rear housing. The front housing and the rear housing may, but are not limited to, be bonded by using an adhesive, or may be connected firmly by using a fastener such as a screw or a bolt. In addition, the front housing and the rear housing may be alternatively an integrated structure, thereby improving structural reliability of the housing.

In a possible implementation of this application, when the rotation part is specifically disposed, the rotation part includes two parts: a connection part and a support plate. One end of the connection part is rotatably connected to the main shaft, and the other end thereof is fixed to the housing disposed on a same side. The support plate is disposed on a side of the connection part that is close to the flexible display, and the flexible display is fixedly connected to the support plate. Because the rotation part is accommodated in the accommodating slot of the housing on a same side, when the foldable mobile terminal is in a folded state, a gap between the two housings is relatively small at the rotating shaft mechanism. Appearance of the foldable mobile terminal in this application is complete at a bending location, without structural features such as a large hollow or protrusion, thereby improving appearance consistency of the foldable mobile terminal. In addition, because of no relatively large gap between the housings on the two sides of the foldable mobile terminal in the folded state, an external object can be prevented from being inserted between the two housings, thereby reducing a risk of damaging the flexible display.

In a possible implementation of this application, when the connection part is specifically connected to the housing, a support part may be disposed in the accommodating slot of the housing, and the connection part is fixedly connected to the support part. It may be understood that there are a plurality of manners of fixing the connection part to the support part. For example, a mounting hole may be respectively provided on the support part and the connection part, so as to implement a fastened connection between the support part and the connection part by using fasteners mounted in corresponding mounting holes.

In a possible implementation of this application, to enable the two rotation parts and the main shaft to form the accommodating space for accommodating the flexible display, the support plate and the housing may be enabled to have a relative rotation relationship. In this way, a first arc structure may be disposed on the rotation part, and a second arc structure is disposed on the housing, so that an arc surface of the first arc structure can contact an arc surface of the second arc structure, thereby implementing rotation of the first arc structure around the second arc structure, and further implementing rotation of the support plate around the housing. The first arc structure may be directly formed on the support plate, or may be an independent structural member disposed on the support plate. The second arc structure may be directly formed in the housing, or may be an independent structural member disposed in the housing. In addition, a specific disposing form of each of the first arc structure and the second arc structure is not limited in this application. For example, the first arc structure is an arc plate-like structure, and the second arc structure is a solid columnar structure with an arc surface. Alternatively, the second arc structure is an arc plate-like structure, and the first arc structure is a solid columnar structure with an arc surface, provided that a relative rotation relationship between the two can be implemented.

In a possible implementation of this application, the rotation part may further include a support plate slot disposed on the support plate, and the rotating shaft mechanism further has a driving structure inserted into the support plate slot. In a folding process and an unfolding process of the foldable mobile terminal, the driving structure may slide along the support plate slot to drive the support plate to rotate around the housing.

In a possible implementation of this application, when the foldable mobile terminal is in a flattened state, an end surface of the housing that is in contact with the flexible display, an end surface of the support plate that is in contact with the flexible display, and an end surface of the main shaft that is in contact with the flexible display are flush with each other. In this way, collapsing or protruding of the flexible display can be avoided, which helps to avoid stretching or squeezing of the flexible display, thereby reducing a risk of failure of the flexible display. In addition, when the foldable mobile terminal is in the flattened state, the part of the flexible display that is opposite to the main shaft has good appearance flatness, so that light and shadow effects of the flexible display can be effectively improved.

In a possible implementation of this application, one end of the support plate that is close to the main shaft is connected to the main shaft in a lap joint manner. Therefore, the main shaft can support the support plate. In this way, structural stability of the rotating shaft mechanism can be improved, thereby implementing smooth movement of the support plate.

In a possible implementation of this application, the mobile terminal further includes a protection part, the protection part is disposed on a side of the mobile terminal that faces away from the flexible display, and both ends of the protection part may be, but are not limited to, respectively fixed to the two housings. In addition, the protection part may be an elastic protection part, or an elastic structural member may be disposed at each of two ends of the protection part. In this way, in a folding process of the foldable mobile terminal, attaching between the protection part and the rotating shaft mechanism can be implemented by using elastic deformation of the elastic structural member. In a folding process of the foldable mobile terminal, the protection part and the two housings are attached to the rotating shaft mechanism, so as to prevent the rotating shaft mechanism from being exposed on a folding outside of the mobile terminal, thereby protecting the rotating shaft mechanism, and making appearance of the foldable mobile terminal simple and beautiful.

DESCRIPTION OF DRAWING MARKS

10—rotating shaft mechanism; 101—main shaft; 102—left rotation part; 1021—left connection part; 1022—left support plate;
10221—first arc structure; 103—right rotation part; 1031—right connection part; 1032—right support plate;
104—left support plate slot; 105—right support plate slot; 106—rotating shaft cover; 20—left housing; 201—left front housing;
2011—second arc structure; 202—left rear housing; 203—left accommodating slot; 204—support part; 30—right housing;
301—right front housing; 302—right rear housing; 303—right accommodating slot; 40—flexible display; A1—first area; B1—second area;
C—third area; B2—fourth area; A2—fifth area.

DESCRIPTION OF EMBODIMENTS

To make the objectives, technical solutions, and advantages of this application clearer, the following further describes this application in detail with reference to the accompanying drawings.

Figure 2:
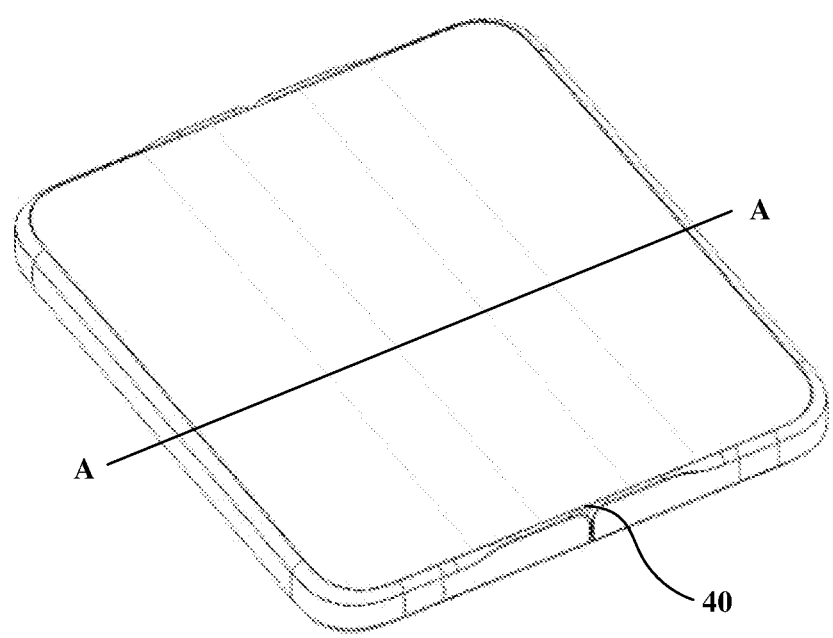
FIG. 2 is an example schematic diagram of a structure of a foldable mobile terminal when an angle of unfolding is 180° according to an embodiment of this application.
Figure 3:
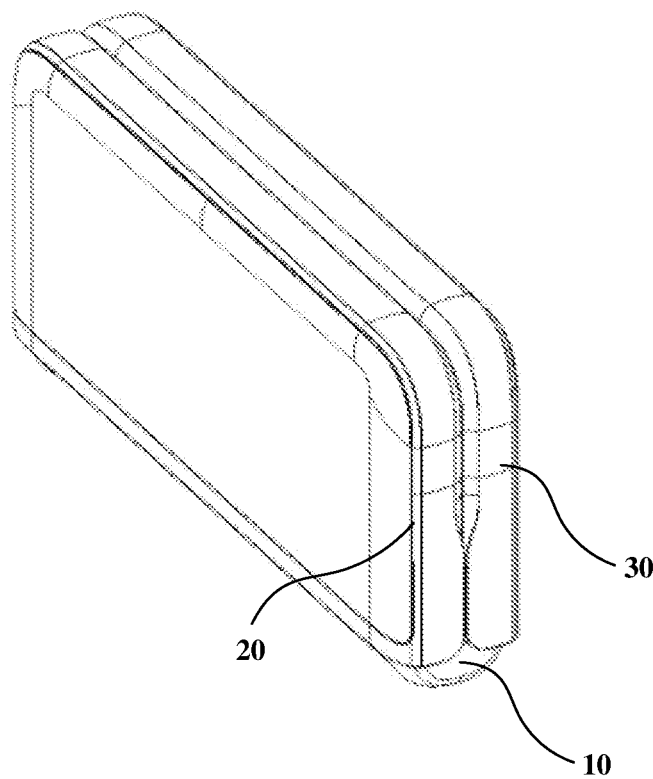
FIG. 3 is an example schematic diagram of a foldable mobile terminal in a folded state according to an embodiment of this application.

For ease of understanding of a foldable mobile terminal provided in this embodiment of this application, the following first describes an application scenario of the foldable mobile terminal. For example, the foldable mobile terminal may be, but is not limited to, a mobile phone, a personal digital assistant (PDA), a notebook computer, a tablet computer, or the like. The foldable mobile terminal provided in this embodiment of this application may include a structure shown in FIG. 1: a left housing 20, a rotating shaft mechanism 10, a right housing 30, and a flexible display 40. When in use, the foldable mobile terminal may be folded and unfolded based on different usage scenarios. FIG. 2 shows a state in which an angle between the left housing 20 and the right housing 30 of the foldable mobile terminal is 180°. FIG. 3 shows a state in which the angle between the left housing 20 and the right housing 30 of the foldable mobile terminal is 0°. A folding process and an unfolding process of the foldable mobile terminal are processes in which the left housing 20 and the right housing 30 rotate around the rotating shaft mechanism 10. For ease of understanding of the foldable mobile terminal provided in this embodiment of this application, the following describes a structure of the foldable mobile terminal in detail with reference to the accompanying drawings.

Figure 1:
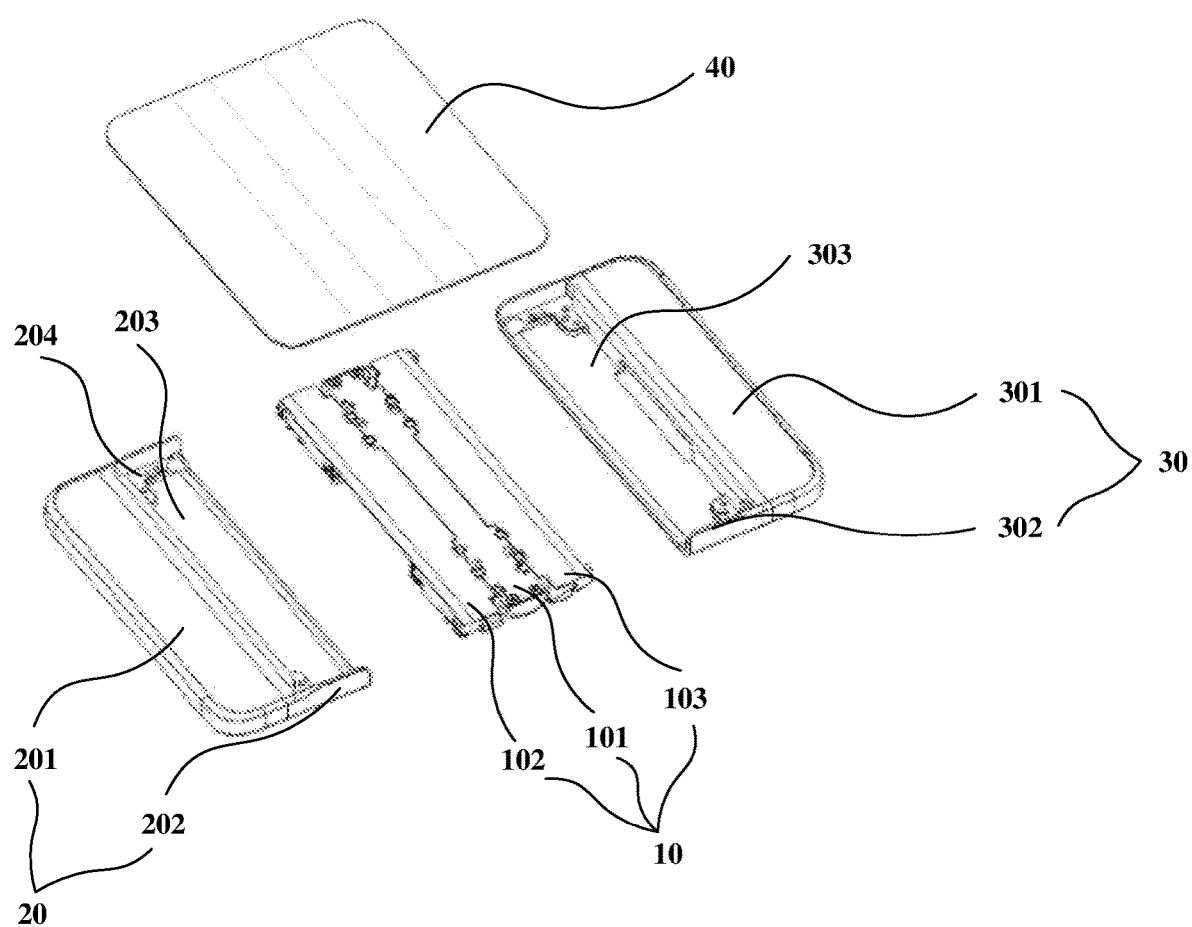
FIG. 1 is an example schematic diagram of a breakdown structure of a foldable mobile terminal according to an embodiment of this application.

Referring to FIG. 1 first, the foldable mobile terminal provided in this embodiment of this application includes the rotating shaft mechanism 10, the left housing 20, the right housing 30, and the flexible display 40 disposed on the rotating shaft mechanism 10, the left housing 20, and the right housing 30, so that the flexible display 40 can be folded by rotation of the left housing 20 and the right housing 30 around the rotating shaft mechanism 10. Referring to FIG. 2 and FIG. 3, when the foldable mobile terminal in this embodiment of this application is folded into the folded state shown in FIG. 3 from the unfolded state shown in FIG. 2, there is no gap between the left housing 20 and the right housing 30 of the foldable mobile terminal in the folded state, so that each body part of the foldable mobile terminal in the folded state has an equal thickness, which helps to improve beauty of appearance of the foldable mobile terminal.

Still referring to FIG. 1, in the foldable mobile terminal, the left housing 20 and the right housing 30 are respectively disposed on two sides of the rotating shaft mechanism 10, and the left housing 20 and the right housing 30 are rotatably connected to the rotating shaft mechanism 10 separately. For ease of describing the structure of the foldable mobile terminal, in this application, a side of the foldable mobile terminal on which the flexible display 40 is disposed is defined as a front side of the foldable mobile terminal, and a side opposite to this side is defined as a rear side of the foldable mobile terminal.

When the left housing 20 is specifically disposed, referring to FIG. 1, the left housing 20 may include a left front housing 201 disposed on the front side of the foldable mobile terminal, and a left rear housing 202 disposed on the rear side of the foldable mobile terminal, where an end portion of the left front housing 201 that is close to the rotating shaft mechanism 10 and the left rear housing 202 form a left accommodating slot 203. The left front housing 201 and the left rear housing 202 may, but are not limited to, be bonded by using an adhesive, or may be connected firmly by using a screw.

Similarly, the right housing 30 may include a right front housing 301 disposed on the front side of the mobile terminal, and a right rear housing 302 disposed on the rear side of the mobile terminal, where an end portion of the right front housing 301 that is close to the rotating shaft mechanism 10 and the right rear housing 302 form a right accommodating slot 303. The right front housing 301 and the right rear housing 302 may, but are not limited to, be bonded by using an adhesive, or may be connected firmly by using a screw. In addition, it may be understood that, in another possible implementation of this application, the left front housing 201 and the left rear housing 202 may alternatively be an integrated structure, and the right front housing 301 and the right rear housing 302 may alternatively be an integrated structure, which helps to simplify structures of the left housing 20 and the right housing 30.

Still referring to FIG. 1, when the rotating shaft mechanism 10 is specifically disposed, the rotating shaft mechanism 10 may include a main shaft 101, a left rotation part 102, and a right rotation part 103, where the left rotation part 102 is rotatably connected to the main shaft 101, and the right rotation part 103 is rotatably connected to the main shaft 101. In a folding process and an unfolding process of the foldable mobile terminal in this application, the left rotation part 102, the main shaft 101, and the right rotation part 103 may form an accommodating space for accommodating the flexible display 40.

Figure 4:
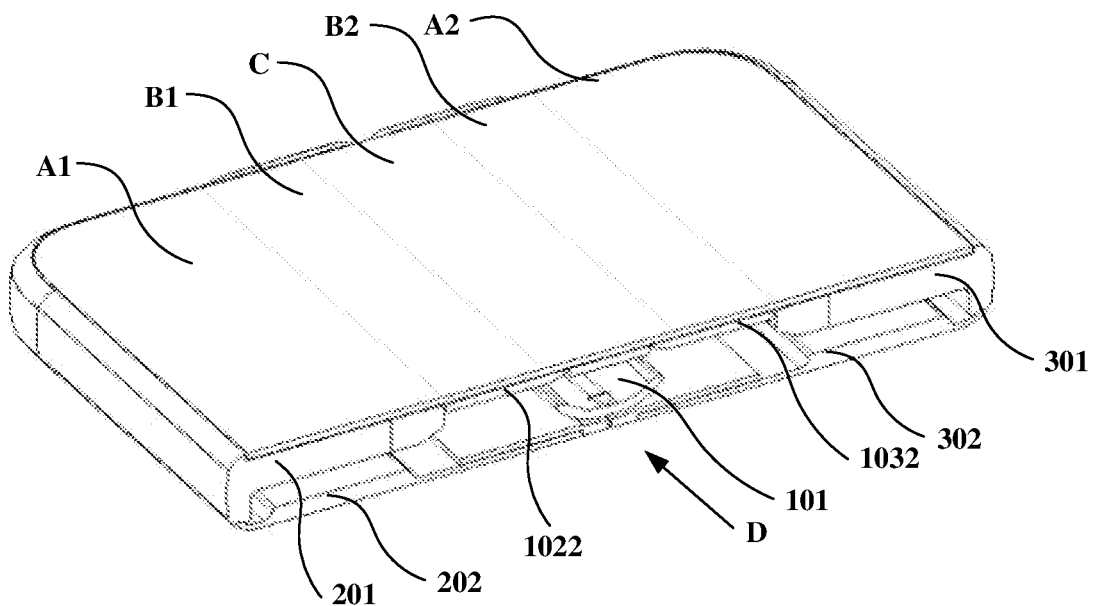
FIG. 4 is an example sectional view of A-A in FIG. 2.
Figure 5:
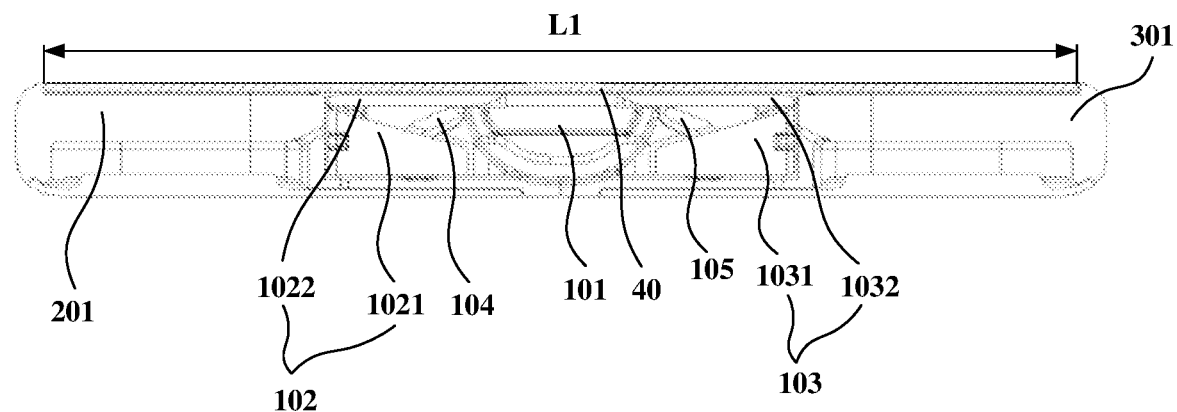
FIG. 5 is an example D-direction view of FIG. 4.

Referring to FIG. 4 and FIG. 5, when the left rotation part 102 is specifically disposed, the left rotation part 102 includes a left connection part 1021 and a left support plate 1022, the left connection part 1021 is rotatably connected to the main shaft 101, and the left support plate 1022 is disposed on a front side of the left connection part 1021. Similarly, the right rotation part 103 includes a right connection part 1031 and a right support plate 1032, the right connection part 1031 is rotatably connected to the main shaft 101, and the right support plate 1032 is disposed on a front side of the right connection part 1031.

When the left housing 20 is connected to the rotating shaft mechanism 10, specifically, referring to FIG. 1, the left rotation part 102 is disposed in the left accommodating slot 203 of the left housing 20, the left connection part 1021 is fixedly connected to the left rear housing 202, and a manner of the fixed connection may be a fastening manner by using a fastener such as a bolt or a screw. When the left connection part 1021 is fastened to the left rear housing 202, referring to FIG. 1, a support part 204 may be disposed in the left accommodating slot 203, and a mounting hole is provided on the support part 204. It may be understood that the foregoing embodiment provides only an example in which the left connection part 1021 is connected to the left rear housing 202, and the left connection part 1021 and the left rear housing 202 may alternatively be connected in another manner. In addition, a connection manner between the right connection part 1031 and the right rear housing 302 is the same as the connection manner on the left side.

Figure 6:
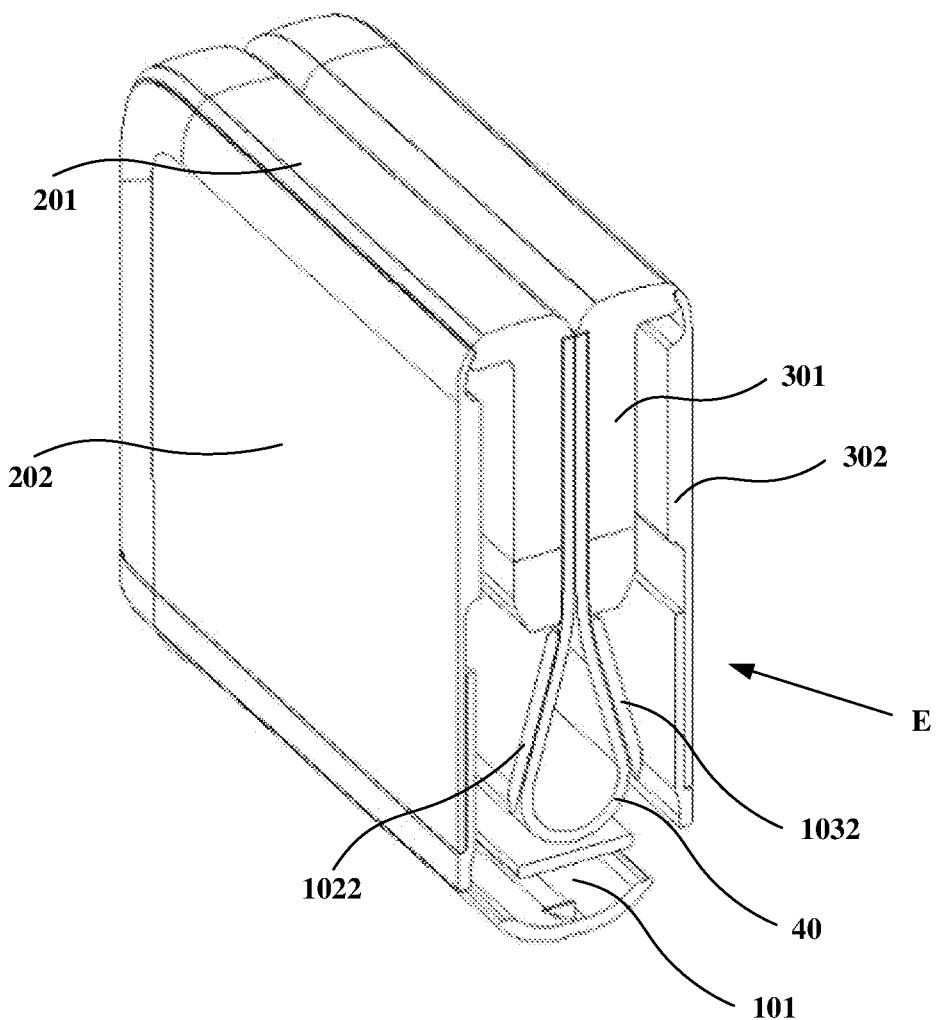
FIG. 6 is an example sectional view of a foldable mobile terminal in a folded state according to an embodiment of this application.

In addition, referring to FIG. 5 and FIG. 6, in a process in which the foldable mobile terminal in this application is folded into a folded state in FIG. 6 from an unfolded state in FIG. 5, to make the left rotation part 102, the main shaft 101, and the right rotation part 103 form an accommodating space for accommodating the flexible display 40, the left support plate 1022 and the left front housing 201 may be enabled to have a relative rotation relationship, and the right support plate 1032 and the right front housing 301 may be enabled to have a relative rotation relationship. It may be understood that, in this embodiment of this application, the left connection part 1021 and the right connection part 1031 may be shaft-like structures disposed along an extension direction of the main shaft 101, so that each part of the main shaft 101 is fixedly connected to the left housing (the right housing) by using the left connection part 1021 (the right connection part 1031). Alternatively, the left connection part 1021 and the right connection part 1031 may be disposed at any part of the main shaft 101, so that a part of the main shaft 101 is fixedly connected to the left housing (the right housing) by using the left connection part 1021 (the right connection part 1031). FIG. 6 is a sectional view of a part in which the left connection part 1021 and the right connection part 1031 are not disposed.

Figure 7:
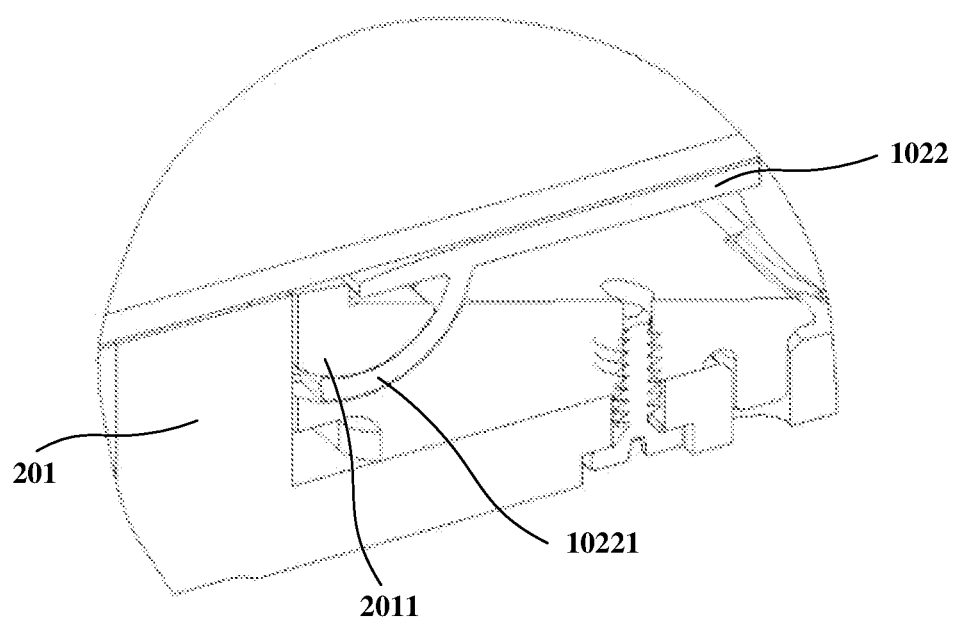
FIG. 7 is an example schematic diagram of a connection structure between a left support plate and a left front housing according to an embodiment of this application.

FIG. 7 is an example rotating connection manner of the left support plate 1022 and the left front housing 201 according to this application. Specifically, a first arc structure 10221 may be disposed on the left support plate 1022, and a second arc structure 2011 is disposed on the left front housing 201, so that an arc surface of the first arc structure 10221 is in contact with an arc surface of the second arc structure 2011, so that the first arc structure 10221 can rotate around the second arc structure 2011, thereby implementing rotation of the left support plate 1022 around the left front housing 201.

In this embodiment of this application, the first arc structure 10221 may be directly formed on the left support plate 1022, or may be an independent structural member disposed on the left support plate 1022; and the second arc structure 2011 may be directly formed in the left front housing 201, or may be an independent structural member disposed in the left front housing 201. The first arc structure 10221 may be an arc plate-like structure, and the second arc structure 2011 may be a solid columnar structure with an arc surface. Alternatively, the second arc structure 2011 may be an arc plate-like structure, and the first arc structure 10221 may be a solid columnar structure with an arc surface, so as to form a rotating kinematic pair between the left support plate 1022 and the left front housing 201. In addition, the rotating kinematic pair formed between the left support plate 1022 and the left front housing 201 may be disposed at any location between the two, for example, an end portion or an intermediate location.

It may be understood that the foregoing embodiment provides only an example in which the left support plate 1022 is rotatably connected to the left front housing 201. The left support plate 1022 and the left front housing 201 may achieve relative rotation in another manner. For example, both the first arc structure 10221 and the second arc structure 2011 may be arc plate-like structures. Alternatively, the first arc structure 10221 is an arc plate-like structure, and the second arc structure 2011 is an arc slide disposed in the left front housing 201. It may be understood that, in some embodiments of this application, the second arc structure 2011 may alternatively be disposed in the left rear housing, a specific disposing manner of the second arc structure 2011 in the left rear housing is similar to that in the case in which the second arc structure 2011 is disposed in the left front housing 201.

In addition, to implement rotation of the right support plate 1032 around the right front housing 301, a connection manner between the right support plate 1032 and the right front housing 301 is the same as that on the left side.

Referring to FIG. 5, a left support plate slot 104 may further be disposed on the left support plate 1022, where a plane in which the left support plate slot 104 is located is perpendicular to a plane in which the left support plate 1022 is located. In addition, the rotating shaft mechanism 10 further has a driving structure (not shown in the figure) disposed in the left support plate slot 104. The driving structure may be, but is not limited to, a pin or a support post, and an acting force between the driving structure and the left support plate slot 104 may support the left support plate 1022. In addition, in a folding process of the rotating shaft mechanism 10, the left support plate 1022 may be driven to rotate around the left front housing 201 by sliding the driving structure along the left support plate slot 104.

Similarly, a right support plate slot 105 may be disposed on the right support plate 1032, and the rotating shaft mechanism 10 further includes a driving structure (not shown in the figure) disposed in the right support plate slot 105. The driving structure may be, but is not limited to, a pin or a support post, and an acting force between the driving structure and the right support plate slot 105 may support the right support plate 1032. In addition, in the folding process of the rotating shaft mechanism 10, the right support plate 1032 is driven to rotate around the right front housing 301 by sliding the driving structure along the right support plate slot 105.

In addition, still referring to FIG. 5, an end of the left support plate 1022 that is close to the main shaft 101 may be connected to the main shaft 101 in a lap joint manner, and an end of the right support plate 1032 that is close to the main shaft 101 may be connected to the main shaft 101 in a lap joint manner, so that the main shaft 101 can support the left support plate 1022 and the right support plate 1032. In a process in which the foldable mobile terminal changes from the folded state shown in FIG. 5 to the unfolded state shown in FIG. 8, the left support plate 1022 rotates relative to the left front housing 201, the right support plate 1032 rotates relative to the right front housing 301, and the left support plate 1022 and the right support plate 1032 can slide on the main shaft 101, thereby avoiding collapsing of the left support plate 1022 and the right support plate 1032 at the main shaft 101, and improving structural stability of the rotating shaft mechanism 10.

When the flexible display 40 is specifically disposed, reference may also be made to FIG. 1, FIG. 4, and FIG. 5. In this embodiment of this application, the flexible display 40 may be sequentially divided into five parts from left to right: a first area A1 fixed to the left housing 20, a second area B1 fixed to the left rotation part 102, a third area C disposed opposite to the main shaft 101, a fourth area B2 fixed to the right rotation part 103, and a fifth area A2 fixed to the right housing 30. There is no connection relationship between the third area C and the main shaft 101, so as to implement free bending in the folding process of the foldable mobile terminal, thereby preventing the flexible display 40 from being affected by tension or pressure. In addition, the flexible display 40 may, but is not limited to, be connected to the left housing 20, the left rotation part 102, the right rotation part 103, and the right housing 30 by using an adhesive such as adhesive glue.

Referring to FIG. 4 and FIG. 5, when fixing of the flexible display 40 is specifically implemented, the first area A1 of the flexible display 40 may be fixed to the left front housing 201, the second area B1 is fixed to the left support plate 1022, the fourth area B2 is fixed to the right support plate 1032, and the fifth area A2 is fixed to the right front housing 301. In this way, in a process in which the foldable mobile terminal changes from the unfolded state shown in FIG. 5 to the folded states shown in FIG. 6 and FIG. 8, the flexible display 40 has a determinate external track under impact of the left front housing 201, the left support plate 1022, the right support plate 1032, and the right front housing 301, so as to prevent the flexible display 40 from sliding relative to the left front housing 201, the left support plate 1022, the right support plate 1032, and the right front housing 301 of the foldable mobile terminal, so as to make a length L1 of the flexible display 40 along the left front housing 201 to the right front housing 301 in FIG. 5 is equal to a length L2 of the flexible display 40 in the state in FIG. 8, thereby preventing the flexible display 40 from being affected by tension or pressure, and reducing a probability of damaging the flexible display 40. In addition, in the folding process and the unfolding process of the foldable mobile terminal, wrinkles of the flexible display 40 can be effectively avoided by fixing the flexible display 40 to the left front housing 201, the left support plate 1022, the right support plate 1032, and the right front housing 301, thereby prolonging a service life of the flexible display 40. It may be understood that, when fixing of the flexible display 40, for example, fixing of the first area A1 of the flexible display 40 to the left front housing 201, is implemented, a part of the first area A1 of the flexible display 40 may be fixed to the left front housing 201, or all parts of the first area A1 of the flexible display 40 may be fixed to the left front housing 201, provided that there is no relative movement between the two.

In addition, referring to FIG. 5, in this embodiment of this application, when the foldable mobile terminal is in the flattened state, end surfaces of the left front housing 201, the left support plate 1022, the main shaft 101, the right support plate 1032, and the right front housing 301 that are in contact with the flexible display 40 are all in a same plane. In this way, collapsing or protruding of the flexible display 40 can be avoided, which helps to avoid stretching or squeezing of the flexible display 40, thereby reducing a risk of failure of the flexible display 40. In addition, referring to FIG. 4, when the foldable mobile terminal is in the flattened state, the third area C of the flexible display 40 has good appearance flatness, so that light and shadow effects of the flexible display 40 can be effectively improved.

Figure 8:
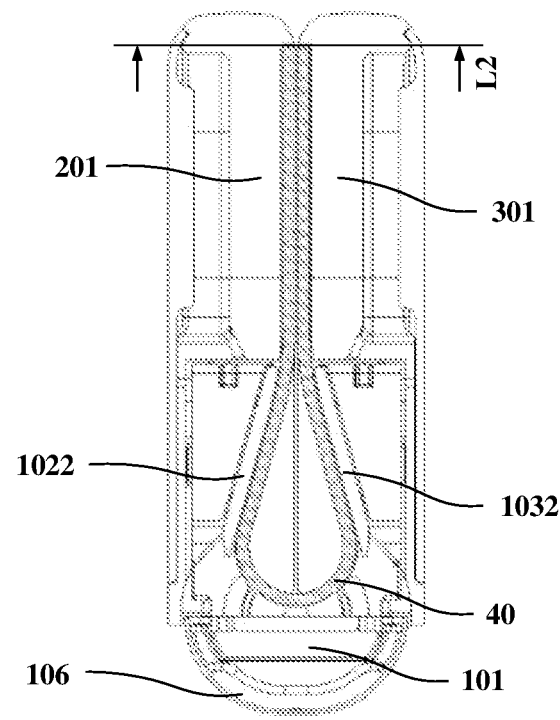
FIG. 8 is an example E-direction view of FIG. 6.

Referring to FIG. 8, in this embodiment of this application, when the foldable mobile terminal is in the folded state, the left support plate 1022, the main shaft 101, and the right support plate 1032 may provide an enough accommodating space for the flexible display 40 at the rotating shaft mechanism, so that a bat-shaped part of the flexible display 40 folded at the rotating shaft mechanism is accommodated in the accommodating space. In addition, still referring to FIG. 8, the rotating shaft mechanism may further include a rotating shaft cover 106 disposed on the rear side of the main shaft 101, and the rotating shaft cover 106 may be disposed in an arc structure, so that the mobile terminal in the folded state has good appearance consistency.

Referring to FIG. 5 and FIG. 8, in the unfolding process and the folding process of the foldable mobile terminal in this application, the left support plate 1022 is always located in the left accommodating slot 203 (with reference to FIG. 1) formed between the left front housing 201 and the left rear housing 202, and the right support plate 1032 is always located in the right accommodating slot 303 (with reference to FIG. 1) formed between the right front housing 301 and the right rear housing 302. In this way, when the foldable mobile terminal is in the folded state, a part of the flexible display 40 that is at the rotating shaft mechanism is accommodated in the accommodating space formed by the left support plate 1022, the main shaft 101, and the right support plate 1032, and other parts of the flexible display 40 are attached to each other. Referring to FIG. 3 and FIG. 8, a gap between the left housing 20 and the right housing 30 is relatively small at the rotating shaft mechanism 10, and appearance of the foldable mobile terminal in this application is complete at a bending location, without structural features such as a large hollow or protrusion, thereby improving appearance consistency of the foldable mobile terminal. In addition, because of no relatively large gap between the housings on the two sides of the foldable mobile terminal in the folded state, an external object can be prevented from being inserted between the two housings, thereby reducing a risk of damaging the flexible display 40.

In addition to the foregoing structures, in some embodiments of this application, the foldable mobile terminal may further include a protection part (not shown in the figure) disposed outside the rotating shaft mechanism, and both ends of the protection part may be, but are not limited to, respectively connected to the left rear housing and the right rear housing. In addition, the protection part may be an elastic protection part, or an elastic structural member is disposed at each of two ends of the protection part. In this way, in the folding process of the foldable mobile terminal, attaching between the protection part and the rotating shaft mechanism can be implemented by using elastic deformation of the elastic protection part or the elastic structural member, so as to prevent the rotating shaft mechanism from being exposed on a folding outside of the mobile terminal, thereby protecting the rotating shaft mechanism, and making the appearance of the foldable mobile terminal simple and beautiful.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A foldable mobile terminal, comprising:
a rotating shaft mechanism;
two housings; and
a flexible display, wherein
the two housings are respectively disposed on two sides of the rotating shaft mechanism, and the flexible display is embedded into the two housings and covers the rotating shaft mechanism,
the rotating shaft mechanism comprises a main shaft and two rotation parts respectively disposed on two sides of the main shaft, and by rotating around the main shaft, the two rotation parts are configured to form an accommodating space for accommodating the flexible display,
a housing, of the two housings, has an accommodating slot on a side close to the rotating shaft mechanism, the two rotation parts are respectively accommodated in the accommodating slots of the two housings, and the housing is configured to rotate around the main shaft to drive a rotation part of the two rotation parts on a same side to rotate,
the flexible display is fixed to the two housings and the two rotation parts, and a part of the flexible display that is opposite to the main shaft is bent freely with rotation of the housing, and
each rotation part of the two rotation parts comprise:
a connection part; and
a support plate, wherein
one end of the connection part is rotatably connected to the main shaft, and the other end thereof is fixed to the housing disposed on a same side, and
the support plate is disposed on a side of the connection part that is close to the flexible display, and the flexible display is fixedly connected to the support plate, wherein
a first arc structure is disposed on the support plate, a second arc structure is disposed on the housing on a same side, and the first arc structure is rotatably connected to the second arc structure, and
the first arc structure is an arc plate-like structure, and the second arc structure is a solid columnar structure with an arc surface, or the second arc structure is an arc plate-like structure, and the first arc structure is a solid columnar structure with an arc surface.

2. The mobile terminal according to claim 1, wherein a support part is disposed in the accommodating slot, and the connection part is fixedly connected to the support part.

3. The mobile terminal according to claim 1, wherein
the first arc structure and the support plate are integrally formed, or
the first arc structure is an independent structural member disposed on the support plate.

4. The mobile terminal according to claim 1, wherein
the second arc structure and the housing are integrally formed, or
the second arc structure is an independent structural member disposed in the housing.

5. The mobile terminal according to claim 1, wherein one end of the support plate, close to the main shaft, is connected to the main shaft in a lap joint manner.

6. The mobile terminal according to claim 1, wherein the rotation part further comprises a support plate slot disposed on the support plate, the rotating shaft mechanism further comprises a driving structure inserted into the support plate slot, and the driving structure slides along the support plate slot to drive the support plate to rotate around the housing.

7. The mobile terminal according to claim 1, wherein
the housing comprises a front housing and a rear housing disposed in an overlapping manner,
the flexible display is fixedly connected to the front housing, and
the accommodating slot is formed between an end portion of the front housing that is close to the rotating shaft mechanism and the rear housing.

8. The mobile terminal according to claim 1, further comprising:
a protection part, wherein
the protection part is disposed on a side of the mobile terminal facing away from the flexible display, and
the protection part is attached to the rotating shaft mechanism.

9. The mobile terminal according to claim 3, wherein
the second arc structure and the housing are integrally formed, or
the second arc structure is an independent structural member disposed in the housing.

10. The mobile terminal according to claim 1, wherein an end of the support plate close to the main shaft connects to the main shaft in a lap joint manner so that the main shaft can support the support plate.

11. The mobile terminal according to claim 1, wherein the support plate rotates relative to the housing, and the support plate slides on the main shaft thereby avoiding collapsing the support plate at the main shaft.

12. A mobile terminal, comprising:
a rotating shaft mechanism;
first and second housings; and
a flexible display, wherein
the first and second housings are respectively disposed on two sides of the rotating shaft mechanism, and the flexible display is embedded into the first and second housings and covers the rotating shaft mechanism,
the rotating shaft mechanism comprises a main shaft and two rotation parts respectively disposed on two sides of the main shaft,
a housing, of the first and second housings, has an accommodating slot on a side close to the rotating shaft mechanism, the two rotation parts are respectively accommodated in the accommodating slots of the first and second housings,
the flexible display is fixed to the first and second housings and the two rotation parts, and a part of the flexible display that is opposite to the main shaft is bent freely with rotation of the housing, and
each rotation part of the two rotation parts comprise:
a connection part; and
a support plate, wherein
one end of the connection part is rotatably connected to the main shaft, and the other end thereof is fixed to the housing disposed on a same side, and
the support plate is disposed on a side of the connection part that is close to the flexible display, and the flexible display is fixedly connected to the support plate, wherein
a first arc structure is disposed on the support plate, a second arc structure is disposed on the housing on a same side, and the first arc structure is rotatably connected to the second arc structure, and
the first arc structure is an arc plate-like structure, and the second arc structure is a solid columnar structure with an arc surface, or the second arc structure is an arc plate-like structure, and the first arc structure is a solid columnar structure with an arc surface.

* * * * *